US010936683B2

(12) United States Patent
Daga et al.

(10) Patent No.: US 10,936,683 B2
(45) Date of Patent: Mar. 2, 2021

(54) CONTENT GENERATION AND TARGETING

(71) Applicant: Microsoft Technology Licensing, LLC, Redmond, WA (US)

(72) Inventors: Pratik Daga, Mountain View, CA (US); Kinjal Basu, Stanford, CA (US); Matthew Hsing Hung Walker, Mountain View, CA (US); Yiping Yuan, Sunnyvale, CA (US); Varun Bharill, Sunnyvale, CA (US); Guanchao Wang, Dublin, CA (US); Shipeng Yu, Sunnyvale, CA (US); Shaunak Chatterjee, Sunnyvale, CA (US); Sowmitra Thallapragada, Fremont, CA (US); Manoj Sivakumar, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 416 days.

(21) Appl. No.: 15/821,663

(22) Filed: Nov. 22, 2017

(65) Prior Publication Data

US 2019/0155957 A1    May 23, 2019

(51) Int. Cl.
| | |
|---|---|
| *H04L 29/06* | (2006.01) |
| *G06F 16/9535* | (2019.01) |
| *H04L 29/08* | (2006.01) |
| *H04L 12/58* | (2006.01) |
| *G06Q 50/00* | (2012.01) |
| *G06Q 10/10* | (2012.01) |
| *H04L 12/28* | (2006.01) |

(52) U.S. Cl.
CPC ........ *G06F 16/9535* (2019.01); *G06Q 10/10* (2013.01); *G06Q 50/01* (2013.01); *H04L 51/32* (2013.01); *H04L 67/22* (2013.01); *H04L 67/26* (2013.01); *H04L 67/306* (2013.01); *H04L 67/36* (2013.01); *H04L 12/2829* (2013.01)

(58) Field of Classification Search
CPC .... G06Q 50/01; G06Q 10/10; G06Q 30/0255; G06Q 30/0269; H04L 51/32; H04L 67/306; H04L 67/26; H04L 67/36; H04L 51/24; H04L 67/22; H04L 63/102; G06F 16/9535; G06F 9/542
See application file for complete search history.

(56) References Cited

U.S. PATENT DOCUMENTS

| | | | |
|---|---|---|---|
| 2012/0166433 A1* | 6/2012 | Tseng ................. | G06Q 30/0224 707/728 |
| 2012/0239507 A1* | 9/2012 | Braginsky ............. | G06Q 10/10 705/14.69 |

(Continued)

*Primary Examiner* — Augustine K. Obisesan
(74) *Attorney, Agent, or Firm* — Schwegman Lundberg & Woessner, P.A.

(57) ABSTRACT

A unified notification platform for offline creation and distribution of notification content from a variety of data sources is described. The notification platform provides data adaptors that are reusable for generating notifications of different types, specifically, for generating notifications of different types that have features that have meaning across different notification types such that these features can be used to generate comparable relevance scores with respect to candidate profiles. The relevance score calculated for a notification with respect to a member profile is used to determine whether the notification is to be presented to the member represented by the member profile.

18 Claims, 4 Drawing Sheets

(56) References Cited

U.S. PATENT DOCUMENTS

| | | | |
|---|---|---|---|
| 2014/0214943 A1* | 7/2014 | Shapero | H04L 12/1895 |
| | | | 709/204 |
| 2016/0036887 A1* | 2/2016 | Ilic | H04L 51/32 |
| | | | 709/206 |
| 2017/0116195 A1* | 4/2017 | Ratiu | H04L 51/32 |
| 2017/0188101 A1* | 6/2017 | Srinivasaraghavan | |
| | | | H04L 43/04 |
| 2018/0329980 A1* | 11/2018 | Ebrahim | G06F 16/355 |

* cited by examiner

CONTENT GENERATION AND TARGETING

TECHNICAL FIELD

This application relates to the technical fields of software and/or hardware technology and, in one example embodiment, to system and method for content generation and targeting in an on-line social network system.

BACKGROUND

An on-line social network may be viewed as a platform to connect people in virtual space, where registered members establish and document networks of people. Each registered member of an on-line social network may be represented by a member profile, which, in turn, may be represented by one or more web pages, a structured representation of the member's information in XML (Extensible Markup Language), JSON (JavaScript Object Notation) or similar format. A member's profile web page of a social networking web site may emphasize employment history and education of the associated member. An on-line social network system also may be configured to facilitate communication among members by, e.g., providing updates relevant to members in the form of notifications.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

A method and system for content generation and targeting in an on-line social network system in an on-line social network is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrase "an on-line social networking application" may be referred to as and used interchangeably with the phrase "an on-line social network" or merely "a social network." It will also be noted that an on-line social network may be any type of an on-line social network, such as, a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). A member profile may be associated with social links that indicate the member's connection to other members of the social network. A member profile may also include or be associated with comments or recommendations from other members of the online social network, with links to other network resources, such as, e.g., publications, etc. As mentioned above, an on-line social networking system may be designed to allow registered members to establish and document networks of people they know and trust professionally. Any two members of a social network may indicate their mutual willingness to be "connected" in the context of the social network, in that they can view each other's profiles, provide recommendations and endorsements for each other and otherwise be in touch via the social network.

The profile information of a social network member may include personal information such as, e.g., the name of the member, current and previous geographic location of the member, current and previous employment information of the member, information related to education of the member, information about professional accomplishments of the member, publications, patents, etc. The profile information of a social network member may also include information about the member's professional skills, such as, e.g., "product management," "patent prosecution," "image processing," etc.). The profile of a member may also include information about the member's current and past employment, such as company identifications, professional titles held by the associated member at the respective companies, as well as the member's dates of employment at those companies.

The on-line social network system is configured to facilitate interactions among members by permitting members to share content, such as, e.g., publications related to science and technology or any other topic. A member can use the on-line social network system to indicate their interest in content (content shared by other members or sponsored content) by "liking" the content item and/or commenting on the content item. Another aspect of the on-line social network system is a notifications platform that generates notifications. Notifications are information items intended to alert a member to content that they may find to be of interest. A notification may be with respect to content, which may be sponsored or shared by another member. A notification may be with respect to information derived from that provided in a member profile, such as, e.g., a member's birthday, job anniversary, change of employment, a new connection, etc. A notification may also be with respect to an action initiated by a member, such as, e.g., sharing, liking, or commenting on a publication, making a change to their profile, connecting with another member, etc. A member profile that triggered a notification generation—e.g., a profile representing a member who shared or interacted with content or a profile from which notification content was derived—is referred for the purposes of this description as a triggering profile. A member profile representing a member that has been identified as being potentially interested in receiving a given notification is referred for the purposes of this description as a candidate profile.

In one example embodiment, the notification platform is a unified platform for offline creation and distribution of notification content from a variety of data sources. The notification platform provides data adaptors that are reusable for generating notifications of different types, specifically, for generating notifications of different types that have features that have meaning across different notification types such that these features can be used to generate comparable relevance scores with respect to candidate profiles. The relevance score calculated for a notification with respect to a member profile is used to determine whether the notification is to be presented to the member represented by the member profile. For example, a notification may be omitted from a user interface configured to present notifications to a member, unless the relevance score for the notification with respect to that member's profile is equal to or greater than a predetermined threshold value. As another example, where multiple notifications have been determined, based on their respective relevance scores, as sufficiently relevant with respect to a member profile, a certain predetermined number of notifications having the highest relevance scores are selected for inclusion into a user interface configured to present notifications to a member. Respective relevance scores generated for notifications with respect to a candidate profile can also be used to determine an order, in which notifications are presented to the member represented by the candidate profile.

An example of a feature that has meaning across different notification types is the number of connections that are connections of a member represented by a candidate profile and are also connections of a member represented by the triggering profile. For instance, a notification of one type (e.g., a notification about a member's birthday) and notifications of another type (e.g., a notification about a news article that a member posted), both can be characterized by a feature that reflects the number of shared connections between a candidate profile and the triggering profile.

Another example of a feature that has meaning across different notification types is connection strength between a candidate profile and the triggering profile. Connection strengths between two member profiles may be calculated based on the number of shared connections, the respective places of employment or schools, the frequency of interacting with each other's content, shared skills and endorsements, etc. Yet another example of a feature that has meaning across different notification types is the click-through-rate (CTR) observed for a candidate profile with respect to a particular notification type, which indicates affinity of a member represented by the candidate profile to this type of notification. CTR values for certain types of notifications may be weighted if those types of notifications have been determined to be of greater or lesser importance within the on-line social network system. Features may be grouped into a few categories: demographic information about both viewer (the member represented by a candidate member profile) and actor (the member represented by the triggering profile), similarity between viewer and actor, strength of connection between viewer and actor, viewer's affinity for notification type, general affinity (determined with respect to all or a given set of member profiles in the on-line social network system) for notifications about the actor.

Figure 1:
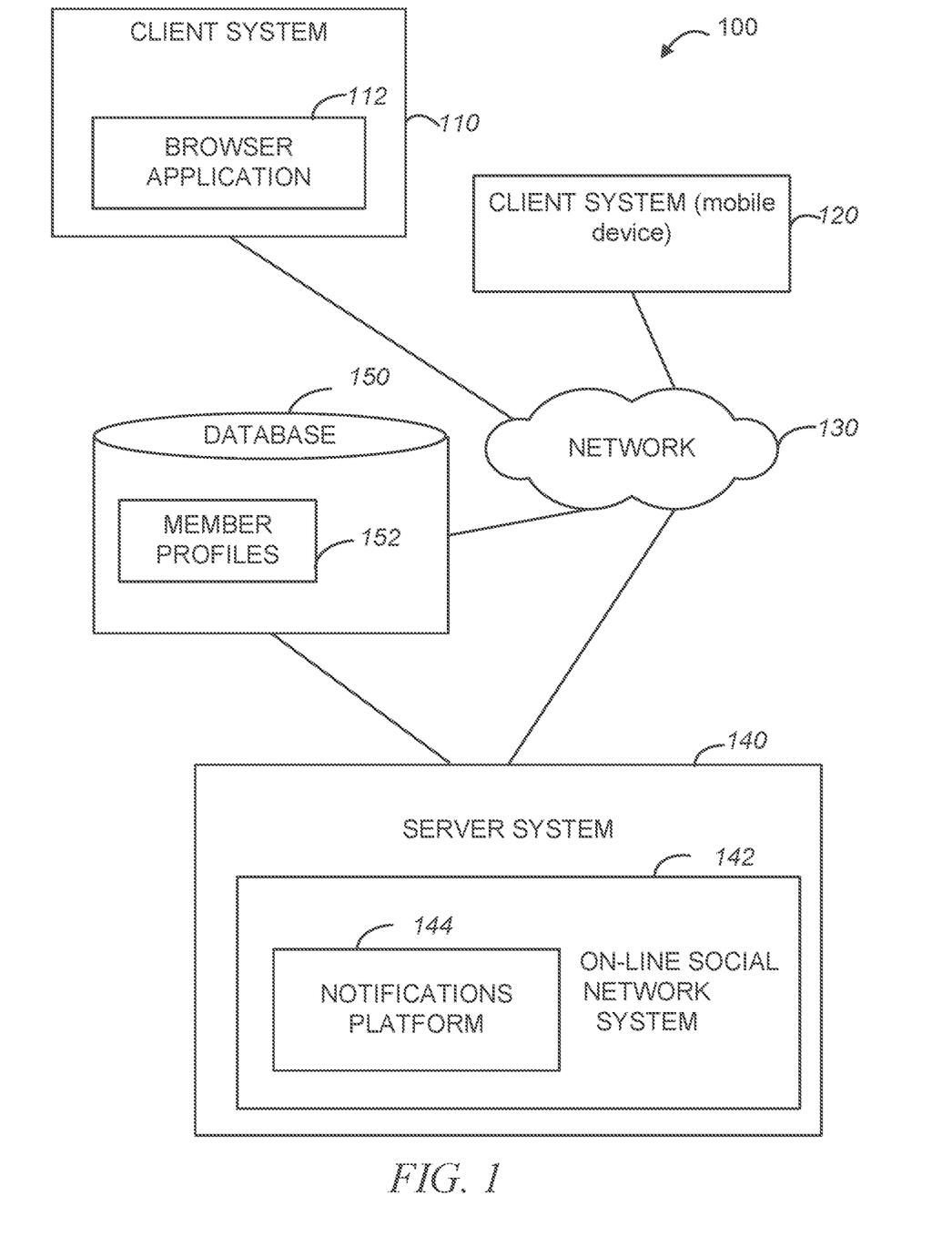
FIG. 1 is a diagrammatic representation of a network environment within which an example method and system for content generation and targeting in an on-line social network system may be implemented.

Example platform for generating notifications in an on-line social network system may be implemented in the context of a network environment 100 illustrated in FIG. 1.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a notification platform 144 for offline creation and distribution of notification content from a variety of data sources. An example notification platform 144 is illustrated in FIG. 2.

Figure 2:
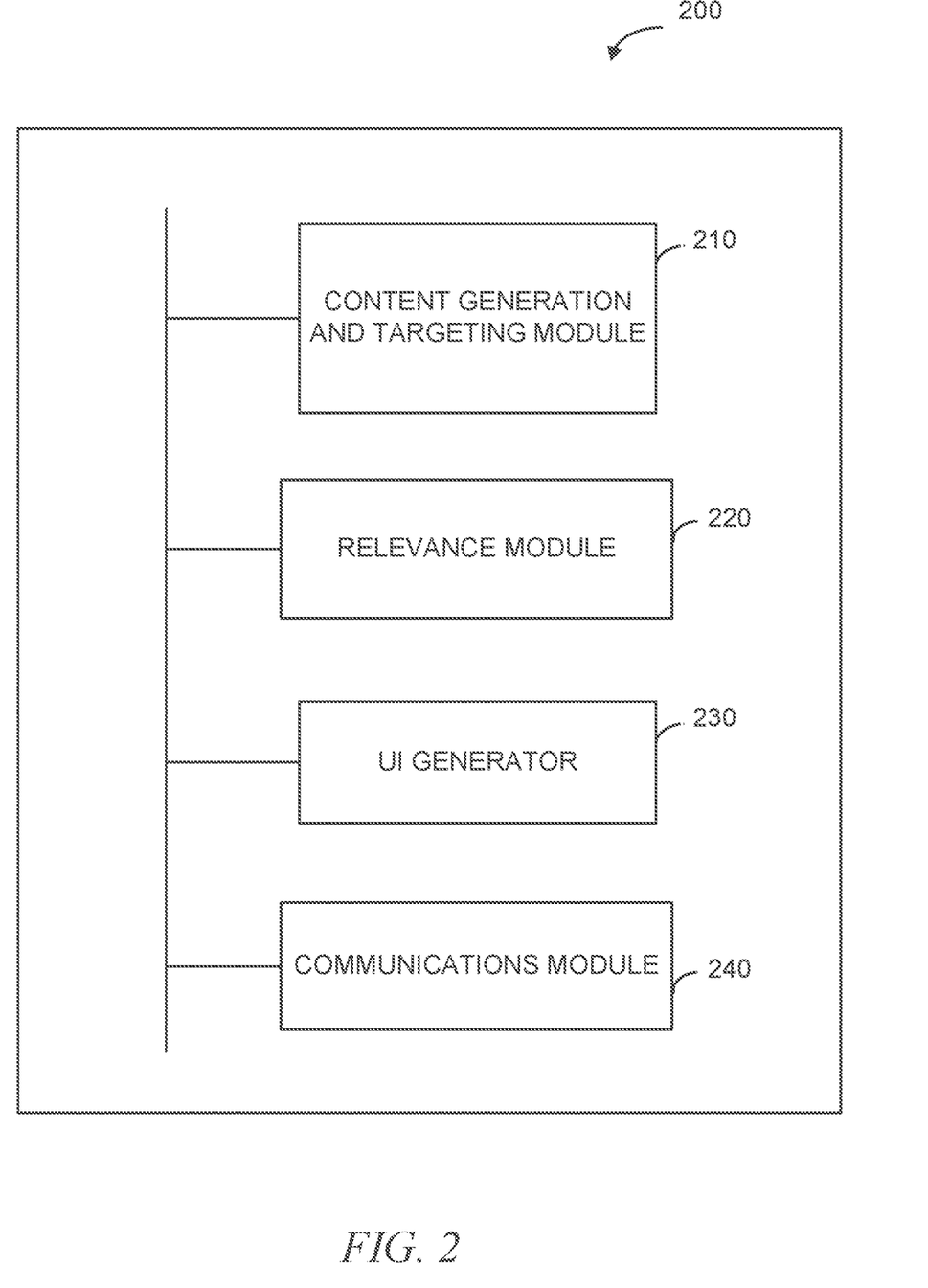
FIG. 2 is block diagram of a system for content generation and targeting in an on-line social network system, in accordance with one example embodiment.

FIG. 2 is a block diagram of a system 200 for content generation and targeting in an on-line social network system, in accordance with one example embodiment. The system 200, in some embodiments, corresponds to the notification platform 144. As shown in FIG. 2, the system 200 includes a content generation and targeting module 210, a relevance module 220, a UI generator 230, and a communications module 240.

The content generation and targeting module 210 is configured to generate notifications. Notifications may be of different notification types, such as, e.g., birthday or work anniversary notification types, suggestions to follow a member or a company, a notification with respect to a member's connection posting or reacting to a content item (e.g., a news article), etc. The content of a notification—the content item—may be a reference to a news article, information regarding a member's interaction with content posted by another member, information derived from information provided to the on-line social network system by a member, etc. For example, the content item in a notification alerting a member to a job anniversary of the member's connection is a content item derived from information provided to the on-line social network system by the member's connection.

The relevance module 220 is configured to generate respective relevance scores for notifications. The relevance score for a notification is generated with respect to a candidate profile (a profile representing a member who is potentially interested in that particular notification). As explained above, the relevance score calculated for a notification with respect to a candidate member profile is used to determine whether the notification is to be presented to the associated member. For example, the system 200 may be configured such that a notification is included into a user interface configured to present notifications to a member only if the relevance score for the notification with respect to that member's profile is equal to or greater than a predetermined threshold value. The relevance module 220 generates the relevance score for a notification using features that have meaning across different notification types, such as, e.g., connection strengths between a candidate profile and a triggering profile, similarity between these two profiles, the CTR observed for a candidate profile with respect to the particular type of a notification, etc.

The UI generator 230 is configured to generate a user interface (UI) that includes one or more notifications that have been selected, based on their respective relevance scores, for presentation to the member represented by a candidate profile. The communications module 240 is configured to cause the UI to be displayed on a display device of a member represented by the candidate profile. Some operations performed by the system 200 may be described with reference to FIG. 3.

Figure 3:
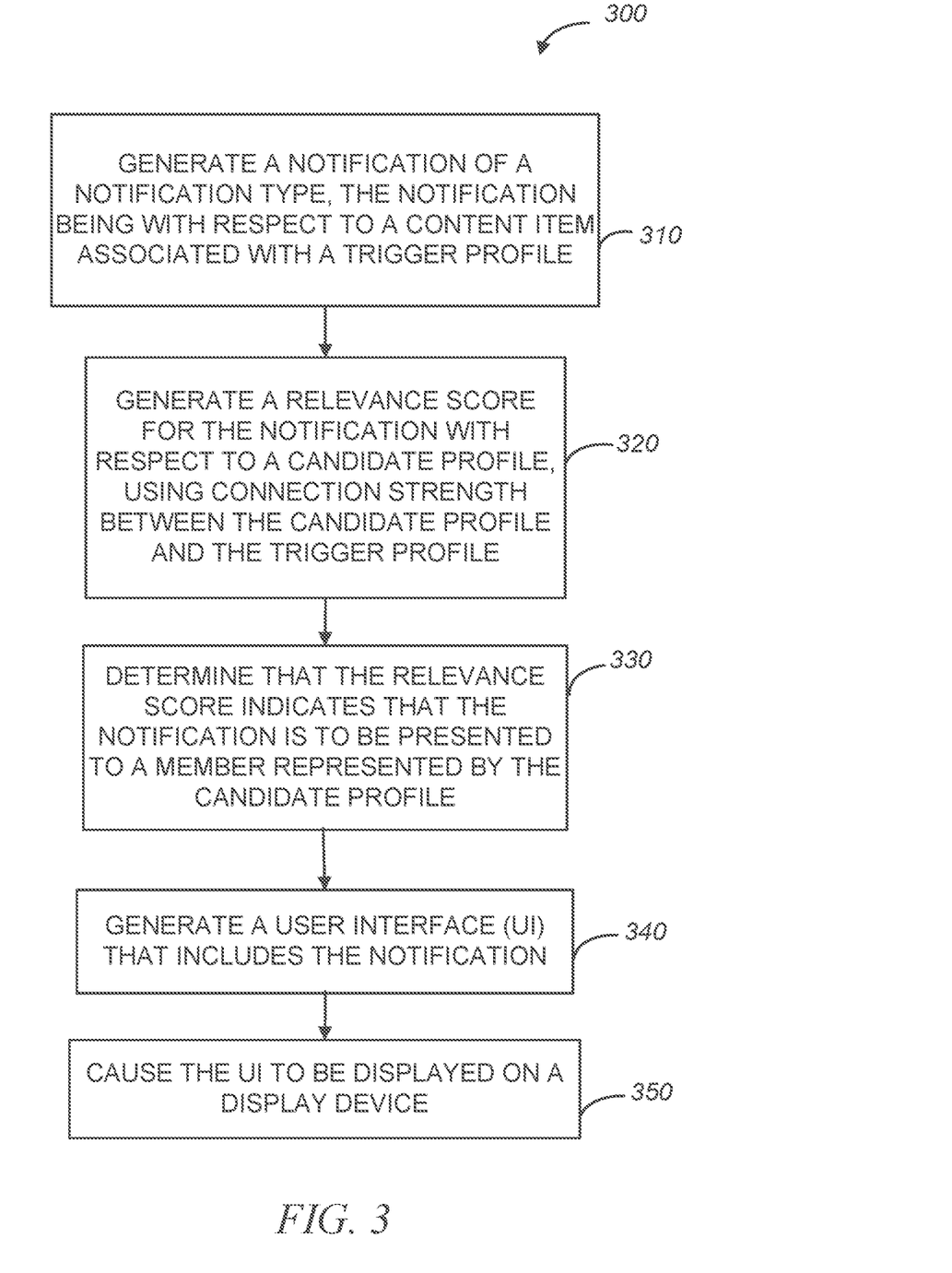
FIG. 3 is a flow chart of a method for content generation and targeting in an on-line social network system, in accordance with an example embodiment.

FIG. 3 is a flow chart of a method 300 for content generation and targeting in an on-line social network system, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the content generation and targeting module 210 generates a notification of a notification type with respect to a content item associated with a trigger profile. At operation 320, the relevance module 220 generates a relevance score for said notification with respect to a candidate profile. Subsequent to determining at operation 230 that the relevance score, generated by the relevance module 220, indicates that the notification is to be presented to a member represented by the candidate profile, the UI generator generates a user interface (UI) that the notification, at operation 240. The communications module 240 causes the UI to be displayed on a display device of a member represented by the candidate profile, at operation 250.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations ma be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 4:
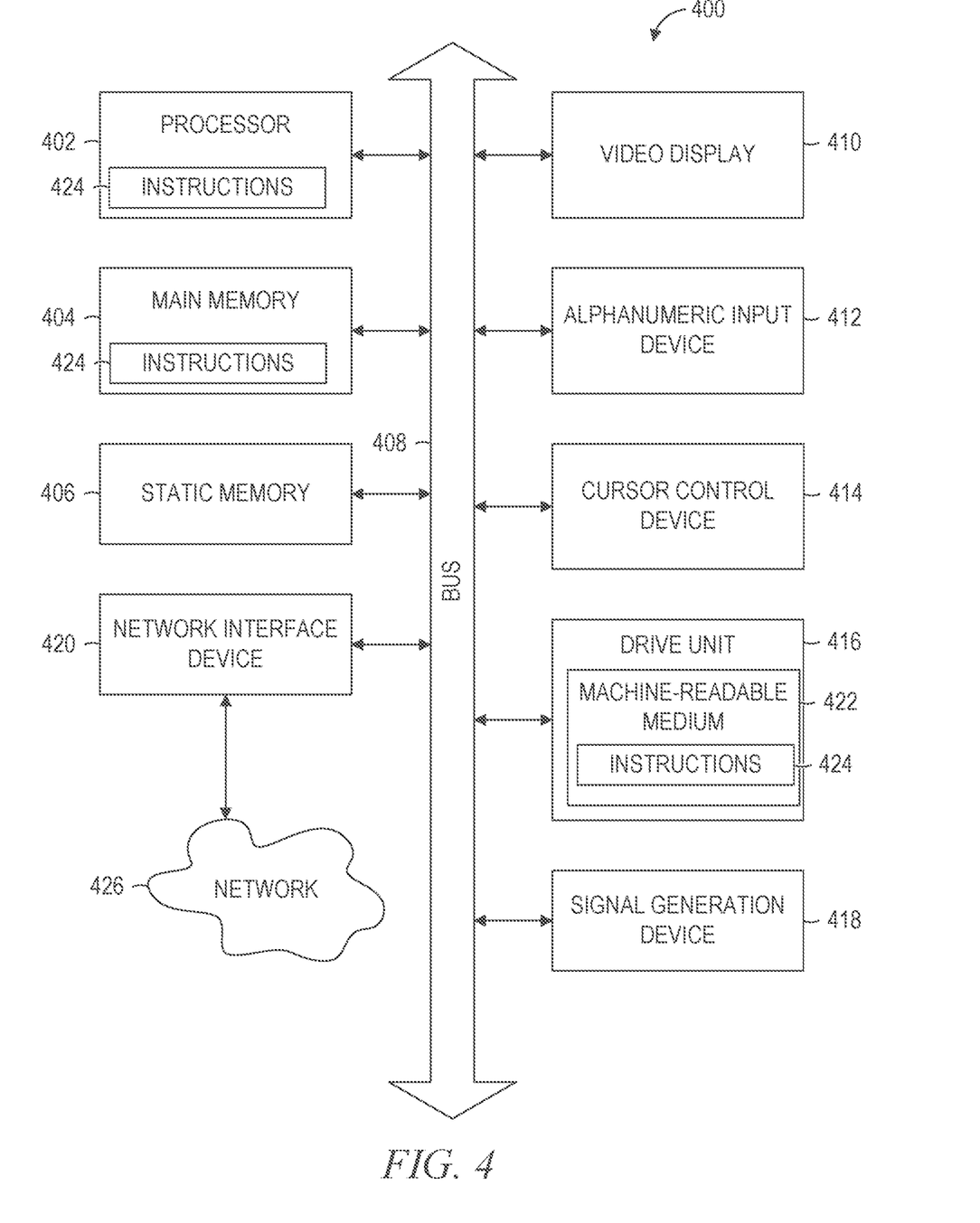
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 400 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 404. The computer system 400 may further include a video display unit 410 (e.g., a liquid crystal display (LCD) or a cathode ray tube (CRT)). The computer system 400 also includes an alpha-numeric input device 412 (e.g., a keyboard), a user interface (UI) navigation device 414 (e.g., a cursor control device), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by, the computer system 400, with the main memory 404 and the processor 402 also constituting machine-readable media.

The software 424 may further be transmitted or received over a network 426 via the network interface device 420 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention." merely for convenience and without intending to voluntarily limit the scope of this application to any single invention or inventive concept if more than one is, in fact, disclosed.

Modules Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, method and system for content generation and targeting in an on-line social network system have been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer-implemented method comprising:
in an on-line network system that maintains member profiles representing members of the on-line network system, generating a notification of a notification type, the notification being with respect to a content item associated with a trigger profile from the member profiles;
using at least one processor, generating a relevance score for the notification with respect to a candidate profile from the member profiles, using connection strength between the candidate profile and the trigger profile, the connection strength reflecting a number of member profiles that are connections of the candidate profile and are also connections of the trigger profile; and
in response to determining that the relevance score indicates that the notification is to be presented to a member represented by the candidate profile, generating a user interface (UI) that includes the notification; and
causing the UI to be displayed on a display device.

2. The system of claim 1, wherein the notification indicates interaction of a member represented by the trigger profile with the content item.

3. The system of claim 1, wherein the content item is a news publication shared in the on-line network.

4. The system of claim 1, wherein the generating of the relevance score for the notification is using similarity between the candidate profile and the trigger profile.

5. The system of claim 1, comprising deriving the content item from information provided to the on-line network system by a member represented by the trigger profile.

6. The system of claim 1, wherein the generating of the relevance score for the notification comprises utilizing previously determined click through rate with respect to the trigger profile and notifications of the notification type.

7. The system of claim 1; comprising:
generating a further notification of a further notification type, the further notification being with respect to a further content item associated with a further trigger profile from the member profiles;
generating a relevance score for the further notification with respect to the candidate profile; and
in response to determining that the relevance score for the further notification indicates that the notification is to be presented to the member represented by the candidate profile; generating the UI that includes the further notification.

8. The method of claim 7, comprising providing a set of data adaptors suitable for generating the notification of the notification type and the further notification of the further notification type.

9. The system of claim 1, wherein the generating of the relevance score for the notification comprises utilizing demographic information with respect to the candidate profile and demographic information with respect to the trigger profile.

10. A system comprising:
one or more processors; and
a non-transitory computer readable storage medium comprising instructions that when executed by the one or processors cause the one or more processors to perform operations comprising:
in an on-line network system that maintains member profiles representing members of the on-line network system, generating a notification of a notification type, the notification being with respect to a content item associated with a trigger profile from the member profiles;
generating a relevance score for the notification with respect to a candidate profile from the member profiles, using connection strength between the candidate profile and the trigger profile, the connection strength reflecting a number of member profiles that are connections of the candidate profile and are also connections of the trigger profile; and
in response to determining that the relevance score indicates that the notification is to be presented to a member represented by the candidate profile, generating a user interface (UI) that includes the notification; and
causing the UI to be displayed on a display device.

11. The system of claim 10, wherein the notification indicates interaction of a member represented by the trigger profile with the content item.

12. The system of claim 10, wherein the content item is a news publication shared in the on-line network.

13. The system of claim 10, wherein the generating of the relevance score for the notification is using similarity between the candidate profile and the trigger profile.

14. The system of claim 10, comprising deriving the content item from information provided to the on-line network system by a member represented by the trigger profile.

15. The system of claim 10, wherein the generating of the relevance score for the notification comprises utilizing previously determined click through rate with respect to the trigger profile and notifications of the notification type.

16. The system of claim 10, comprising:
generating a further notification of a further notification type, the further notification being with respect to a further content item associated with a further trigger profile from the member profiles;
generating a relevance score for the further notification with respect to the candidate profile; and
in response to determining that the relevance score for the further notification indicates that the notification is to be presented to the member represented by the candidate profile, generating the UI that includes the further notification.

17. The system of claim 16, comprising providing a set of data adaptors suitable for generating the notification of the notification type and the further notification of the further notification type.

18. A machine-readable non-transitory storage medium having instruction data executable by a machine to cause the machine to perform operations comprising:
in an on-line network system that maintains member profiles representing members of the on-line network system, generating a notification of a notification type; the notification being with respect to a content item associated with a trigger profile from the member profiles;
generating a relevance score for the notification with respect to a candidate profile from the member profiles, using connection strength between the candidate profile and the trigger profile, the connection strength reflecting a number of member profiles that are connections of the candidate profile and are also connections of the trigger profile; and
in response to determining that the relevance score indicates that the notification is to be presented to a member represented by the candidate profile, generating a user interface (UI) that includes the notification; and
causing the UI to be displayed on a display device.

* * * * *

UNITED STATES PATENT AND TRADEMARK OFFICE
CERTIFICATE OF CORRECTION

PATENT NO. : 10,936,683 B2  
APPLICATION NO. : 15/821663  
DATED : March 2, 2021  
INVENTOR(S) : Daga et al.

Page 1 of 1

It is certified that error appears in the above-identified patent and that said Letters Patent is hereby corrected as shown below:

In the Claims

In Column 9, Line 16, in Claim 7, delete "claim 1;" and insert --claim 1,-- therefor In Column 9, Line 26, in Claim 7, delete "profile;" and insert --profile,-- therefor In Column 10, Line 41, in Claim 18, delete "type;" and insert --type,-- therefor Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*